United States Patent
Chen et al.

(10) Patent No.: US 10,778,369 B2
(45) Date of Patent: Sep. 15, 2020

(54) METHOD AND APPARATUS FOR ACQUIRING CHANNEL STATE INFORMATION (CSI)

(71) Applicant: ZTE Corporation, Shenzhen (CN)

(72) Inventors: Zewei Chen, Shenzhen (CN); Jun Xu, Shenzhen (CN); Yu Ngok Li, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 78 days.

(21) Appl. No.: 15/554,081

(22) PCT Filed: Aug. 5, 2015

(86) PCT No.: PCT/CN2015/086170
§ 371 (c)(1),
(2) Date: Dec. 22, 2017

(87) PCT Pub. No.: WO2016/134585
PCT Pub. Date: Sep. 1, 2016

(65) Prior Publication Data
US 2018/0115389 A1    Apr. 26, 2018

(30) Foreign Application Priority Data
Feb. 28, 2015   (CN) .......................... 2015 1 0092381

(51) Int. Cl.
*H04L 1/00* (2006.01)
*H04L 5/00* (2006.01)
*H04L 25/02* (2006.01)

(52) U.S. Cl.
CPC .............. *H04L 1/0035* (2013.01); *H04L 1/00* (2013.01); *H04L 1/0003* (2013.01);
(Continued)

(58) Field of Classification Search
CPC ....... H04L 5/0051; H04L 5/0048; H04L 5/10; H04L 25/0226; H04L 5/0091; H04L 5/0023; H04L 5/0044; H04L 5/005
(Continued)

(56) References Cited

U.S. PATENT DOCUMENTS

| 8,838,164 | B2 * | 9/2014 | Koo | .......................... H04L 1/20 455/501 |
| 8,867,648 | B2 * | 10/2014 | Kim | ...................... H04B 7/0639 375/260 |
| 2014/0226508 | A1 * | 8/2014 | Asplund | ................. H04L 43/50 370/252 |

FOREIGN PATENT DOCUMENTS

| CN | 102201897 A | 9/2011 |
| CN | 102263584 A | 11/2011 |

(Continued)

OTHER PUBLICATIONS

International Search Report for corresponding application PCT/CN2015/086170 filed on Aug. 5, 2015; dated Dec. 3, 2015.

*Primary Examiner* — David C Payne
*Assistant Examiner* — Sarah Hassan
(74) *Attorney, Agent, or Firm* — Cantor Colburn LLP

(57) ABSTRACT

A method and device for acquiring Channel State Information (CSI) are provided. In the method, a second node receives a first-type signal and/or a second-type signal sent by a first node; the second node acquires CSI based on measurement of the first-type signal and the second-type signal, or based on measurement of the second-type signal only; the first-type signal may include a measurement Reference Signal (RS), and the second-type signal may include one of: a demodulation RS, a data sharing channel signal, and a signal combination of the data sharing channel signal and the demodulation RS; the second node feeds back the CSI to the first node.

19 Claims, 4 Drawing Sheets

(52) U.S. Cl.
CPC .......... *H04L 1/0009* (2013.01); *H04L 1/0026* (2013.01); *H04L 1/0027* (2013.01); *H04L 1/0036* (2013.01); *H04L 5/005* (2013.01); *H04L 5/0023* (2013.01); *H04L 5/0051* (2013.01); *H04L 5/0057* (2013.01); *H04L 25/0224* (2013.01)

(58) Field of Classification Search
USPC .......................................... 375/329; 330/129
See application file for complete search history.

(56) References Cited

FOREIGN PATENT DOCUMENTS

| | | |
|---|---|---|
| CN | 102300244 A | 12/2011 |
| WO | 2014070410 | 5/2014 |

\* cited by examiner

METHOD AND APPARATUS FOR ACQUIRING CHANNEL STATE INFORMATION (CSI)

TECHNICAL FIELD

The disclosure relates to the communication field, in particular to a method and device for acquiring Channel State Information (CSI).

BACKGROUND

In a mobile communication system, there may be many uncertainties in a communication process because of time variant characteristics of a wireless fading channel. On one hand, in order to improve a system throughput, a high-order modulation with high transmission rate and an error correcting code with less redundancy may be adopted to perform communications. When this technology is adopted, the system throughput may be effectively improved when a Signal to Noise Ratio (SNR) of the wireless fading channel is ideal; but it may be impossible to ensure that communications are performed reliably and stably when the channel dips into a deep fade. On the other hand, in order to ensure the reliability of communications, a low-order modulation with low transmission rate and an error correcting code with more redundancy are adopted to perform communications. When this technology is adopted, it may be possible to ensure that communications are performed reliably and stably when the wireless fading channel dips into a deep fade; but when the SNR of the channel is high, because the transmission rate is low, the improvement of the system throughput may be restricted, which wastes resources. In an early stage of development of mobile communication technologies, people may try to resist the time variant characteristics of the wireless fading channel by solely improving transmitting power of a transmitter, and may use a low-order modulation and coding method with more redundancy to ensure the communication quality of a system when the channel dips into a deep fade. However, the problem regarding how to improve the system throughput is not taken into consideration. With the development of technological level, an adaptive coding and modulation technology, which belongs to a most typical link adaption technology, emerges. The adaptive coding and modulation technology may adaptively regulate, according to a channel state, a transmitting power of a channel, a modulation and coding mode and a frame length of data to overcome the time variant characteristics of channel, thereby achieving the best communication effect.

In a Long Term Evolution (LTE) system, for realizing a downlink adaptive coding and modulation technology, control signaling including CSI may be transmitted in the uplink. The CSI may include a Channel Quality Indicator (CQI), a Precoding Matrix Indicator (PMI) and a Rank Indicator (RI). The CSI may reflect a physical downlink channel state. A base station, for example, an Evolved Node B (eNodeB) may use the CSI to perform downlink scheduling and perform coding and modulation of data.

In order to acquire the CSI, the eNodeB may send a downlink Reference Signal (RS). User Equipment (UE) may acquire the CSI by performing channel and interference measurement according to the RS. In the LTE system, the RS usually used for acquiring the downlink CSI may include a Cell-specific Reference Signal (CRS) and a CSI Reference Signal (CSI-RS). The CRS is introduced in the LTE standard of Release-8 (Rel-8). Corresponding to 1/2/4 antenna port(s), the CRS for the 1/2/4 antenna port(s) is defined. The CSI-RS is introduced in the LTE standard of Release-10 (Rel-10), mainly used for a Transmission Mode (TM) 9/10. Corresponding to 1/2/4/8 antenna port(s), the CSI-RS for the 1/2/4/8 antenna port(s) is defined. For a specific antenna port configuration, the RS may occupy, on frequency-domain resources, specific Resource Elements (REs) according to a fixed distribution pattern. Both the CRS and the CSI-RS may be sent on a whole system bandwidth. After acquiring the CSI, the UE may send the CSI to the eNodeB by way of periodic feedback or non-periodic feedback.

The LTE system defines relevant CSI (CQI/PMI) feedback types. For a non-periodic CSI report, the CQI feedback types may include wide-band CQI, UE selected sub-band CQI, and higher layer configured sub-band CQI. When the wide-band CQI feedback type is configured, the UE may feed back the CSI reflecting the channel quality of the whole system bandwidth. When the UE selected sub-band CQI feedback type is configured, the UE may select M sub-bands, and may report location information of the M sub-bands and the CSI reflecting the whole channel quality of the M sub-bands. For the higher layer configured sub-band CQI feedback type, the UE may report the CSI of each sub-band. For a periodic CSI report, the CQI feedback types may include wide-band CQI and UE selected sub-band CQI. When the UE selected sub-band CQI feedback type is configured, the UE may report in one sub-frame the CSI of a sub-band of a Bandwidth Part (BP), and report information about different BPs in different sub-frames.

With the richness of application requirements and the development of wireless communication technology, future communication systems (e.g. the fifth generation (5G) communication system) may face more complex wireless channel environments. For example, a huge number of users and burst service data may bring about more interference, and a big path loss and a deep fade may reduce the SNR of received signals. Such a complex channel condition may cause an inaccurate acquisition of the CSI, and the inaccurate CSI or mutational channel may make a CSI mismatch phenomenon even worse. The CSI feedback in a related technology, mainly aiming at the CSI feedback for the whole bandwidth or sub-band, may not provide, on data frequency resources, like a Physical Downlink Shared Channel (PDSCH) in the LTE system, a timely feedback on a channel and interference condition. Moreover, in the related technology, the CSI is measured by adopting pilot frequencies such as the CRS and the CSI-RS, and the measurement accuracy of these kinds of pilot frequencies may be limited under an extremely low SNR scenario. Therefore, a new type of CSI measurement and feedback solution may be needed to improve the CSI accuracy and provide more timely and more proper feedback of the channel state on the data frequency resources, thereby realizing channel adaptation better.

An effective solution has not been presented aiming at a problem in the related technology that CSI measurement accuracy is not high and CSI feedback on a data sharing channel is not timely.

SUMMARY

Some exemplary embodiments of the disclosure provide a method and device for acquiring CSI, which may solve a problem in the related technology that CSI measurement accuracy is not high and CSI feedback on a data sharing channel is not timely.

According to an exemplary embodiment of the disclosure, a method for acquiring CSI is provided, which may include the following acts. A second node receives a first-type signal and/or a second-type signal sent by a first node. The second node acquires CSI based on measurement of the first-type signal and the second-type signal, or based on measurement of the second-type signal only, in this exemplary embodiment, the first-type signal may include a measurement RS, and the second-type signal may include one of: a demodulation RS, a data sharing channel signal, and a signal combination of the data sharing channel signal and the demodulation RS. The second node feeds back the CSI to the first node.

In an exemplary embodiment, modes of acquiring, by the second node, the CSI based on the measurement of the first-type signal and the second-type signal, or based on the measurement of the second-type signal only may include at least one of the following modes:

Mode 1: acquiring the CSI according to the first-type signal and a first data signal, or according to the first-type signal and the demodulation RS; in this mode the first data signal may be obtained by processing the received data sharing channel signal;

Mode 2: processing the received data sharing channel signal to obtain a first data signal; and acquiring the CSI according to the first-type signal, the first data signal and the demodulation RS;

Mode 3: acquiring the CSI according to the second-type signal;

Mode 4: selecting a signal type from a set of candidate signals; and acquiring the CSI based on measurement of the selected signal type.

In an exemplary embodiment, the Mode 1 of acquiring the CSI may include at least one of the following sub-modes:

Sub-mode 1a: performing measurement based on the first-type signal to acquire first CSI; performing measurement based on the first data signal or the demodulation RS to acquire second CSI; and acquiring the CSI according to the first CSI and the second CSI;

Sub-mode 1b: performing measurement based on the first-type signal to acquire third CSI; performing measurement based on the first data signal and the first-type signal, or based on the demodulation RS and the first-type signal to obtain fourth CSI; and acquiring the CSI according to the third CSI and the fourth CSI;

Sub-mode 1c: performing channel measurement based on a non-zero power measurement RS to obtain a first measurement result; performing interference measurement based on the first data signal or the demodulation RS to obtain a second measurement result; and acquiring the CSI according to the first measurement result and the second measurement result;

Sub-mode 1d: performing channel measurement based on a non-zero power measurement RS to obtain a third measurement result; performing interference measurement based on the first data signal and a zero power measurement RS, or based on the demodulation RS and the zero power measurement RS to obtain a fourth measurement result; and acquiring the CSI according to the third measurement result and the fourth measurement result;

Sub-mode 1e: performing channel measurement based on the first data signal or the demodulation RS to obtain a fifth measurement result; performing interference measurement based on the first data signal and a zero power measurement RS, or based on the demodulation RS and the zero power measurement RS to obtain a sixth measurement result; and acquiring the CSI according to the fifth measurement result and the sixth measurement result.

In an exemplary embodiment, the Mode 2 of acquiring the CSI may include at least one of the following sub-modes:

Sub-mode 2a: performing measurement based on the first-type signal to acquire fifth CSI; performing measurement based on the first data signal and the demodulation RS to acquire sixth CSI; and acquiring the CSI according to the fifth CSI and the sixth CSI;

Sub-mode 2b: performing measurement based on the first-type signal to acquire seventh CSI; performing measurement based on the first data signal, the demodulation RS and the first-type signal to obtain eighth CSI; and acquiring the CSI according to the seventh CSI and the eighth CSI;

Sub-mode 2c: performing channel measurement based on a non-zero power measurement RS to obtain a seventh measurement result; performing interference measurement based on the first data signal and the demodulation RS to obtain an eighth measurement result; and acquiring the CSI according to the seventh measurement result and the eighth measurement result;

Sub-mode 2d: performing channel measurement based on a non-zero power measurement RS to obtain a ninth measurement result; performing interference measurement based on the first-type signal, the demodulation RS and a zero power measurement RS to obtain a tenth measurement result; and acquiring the CSI according to the ninth measurement result and the tenth measurement result;

Sub-mode 2e: performing channel measurement based on the first data signal and the demodulation RS to obtain an eleventh measurement result; performing interference measurement based on the first data signal, the demodulation RS and a zero power measurement RS to obtain a twelfth measurement result; and acquiring the CSI according to the eleventh measurement result and the twelfth measurement result.

In an exemplary embodiment, the Mode 3 of acquiring the CSI may include at least one of the following sub-modes:

Sub-mode 3a: processing the received data sharing channel signal to obtain a first data signal; and performing measurement based on the demodulation RS to acquire ninth CSI; performing measurement based on the first data signal to acquire tenth CSI; and acquiring the CSI according to the ninth CSI and the tenth CSI;

Sub-mode 3b: performing channel measurement and interference measurement based on the demodulation RS to obtain a thirteenth measurement result; correcting channel measurement based on the first data signal to obtain a fourteenth measurement result; and acquiring the CSI according to the thirteenth measurement result and the fourteenth measurement result;

Sub-mode 3c: performing channel measurement and interference measurement based on the demodulation RS to obtain a fifteenth measurement result; and acquiring the CSI according to the fifteenth measurement result.

In an exemplary embodiment, the measurement based on the first-type signal and the second-type signal, or the measurement based on the second-type signal only, which is performed by the second node, may include at least one of: channel measurement and interference measurement.

In an exemplary embodiment, when the CSI is acquired according to the Mode 4, the set of candidate signals may include at least one of:

a candidate signal set 1 including: the measurement RS and the demodulation RS;

a candidate signal set 2 including: the measurement RS, and a combination of the demodulation RS and the first data signal;

a candidate signal set 3 including: a combination of the measurement RS and the demodulation RS, and a combination of the measurement RS and the first data signal, in this exemplary embodiment, the first data signal may be obtained by processing the data sharing channel signal;

a candidate signal set 4 including: the measurement RS, the demodulation RS, and the first data signal;

a candidate signal set 5 including: the demodulation RS and the first data signal.

In an exemplary embodiment, when a preset condition is satisfied, the first data signal may be selected from the set of candidate signals, and the CSI may be acquired based on the first data signal. In this exemplary embodiment, the preset condition may at least include one of:

a Signal to Interference plus Noise Ratio (SINR) before the data sharing channel signal is demodulated is greater than or equal to a preset threshold;

a sum of absolute values of log likelihood ratios of data obtained by decoding the data sharing channel signal is greater than or equal to a preset threshold;

an estimated data error rate output after the data sharing channel signal is decoded is less than a preset threshold;

an SINR of a pilot frequency on an antenna port is less than a preset threshold;

data of the data sharing channel signal is received correctly.

In an exemplary embodiment, the first data signal may include at least one of: a soft-output data signal after decoding, a soft-output data signal after demodulation and a data signal before demodulation.

In an exemplary embodiment, the soft-output data signal after decoding and the soft-output data signal after demodulation are essentially a probability, e.g., a probability that a relevant bit or symbol is a specific bit or a specific symbol. The data signal before demodulation may be data on an antenna port of a receiving end. Data on the antenna port of a transmitting end, which is obtained by performing, to decoded data, coding and modulation and other processing of the transmitting end, may serve as a pilot frequency. Channel estimation and interference estimation may be performed more accurately with reference to the data on the antenna port of the transmitting end and the data on the antenna port of the receiving end.

In an exemplary embodiment, the CSI may include at least one of: first-type CSI and second-type CSI. In this exemplary embodiment, the first-type CSI may include at least one of: a CQI, a PMI, an RI, channel matrix indicator information, beam indication information, antenna selection indication information, error level indication information, repetitions level indication information, and power parameter level indication information. The second-type CSI may include at least one of: interference resource location indication information, interference channel indication information, interference channel correlation matrix indication information, transmission parameters of an interference signal, and interference level indication information.

In an exemplary embodiment, the CSI may be a report set of CSI report modes. The report set may include at least one of: a combination of a wide-band CSI report set and a PDSCH sub-band CSI report set, and the PDSCH sub-band CSI report set.

In an exemplary embodiment, the wide-band CSI report set may be used for indicating the CSI on a sub-band set S1 on system bandwidth. In this exemplary embodiment, the sub-band set S1 on the system bandwidth may include K1 sub-bands. The PDSCH sub-band CSI report set is used for indicating the CSI on a sub-band set S2 corresponding to a data sharing channel. The sub-band set S2 may include K2 sub-bands, where the k1 and the k2 are integers greater than 1.

In an exemplary embodiment, a sub-band size k1 of the sub-band set S1 on the system bandwidth may be determined according to the system bandwidth; a sub-band size k2 of the sub-band set S2 of PDSCH sub-bands may be determined according to a bandwidth occupied by the PDSCH; where the k1 and the k2 are integers greater than 1.

In an exemplary embodiment, the sub-band size k2 of the sub-band set S2 of the PDSCH sub-bands increases along with increase of the bandwidth occupied by the PDSCH.

In an exemplary embodiment, the PDSCH sub-bands may be determined according to at least one of the following definitions:

a PDSCH sub-band definition 1: the PDSCH sub-bands are a segment of frequency resources; a starting point of the PDSCH sub-band set is the first Resource Block (RB) of frequency resources occupied by the PDSCH, and floor (PDSCHBW/k2) PDSCH sub-bands among all PDSCH sub-bands in the PDSCH sub-band set have a bandwidth of k2; if the PDSCHBW/k2 is not an integer, remaining RBs of the PDSCH except RBs occupied by the floor(PDSCHBW/k2) PDSCH sub-bands form one sub-band, and frequency resources of the floor(PDSCHBW/k2)+1 PDSCH sub-bands are not overlapped, and the floor(PDSCHBW/k2)+1 PDSCH sub-bands form the PDSCH sub-band set; if the PDSCHBW/k2 is an integer, frequency resources of the floor(PDSCHBW/k2) PDSCH sub-bands are not overlapped, and the floor(PDSCHBW/k2) PDSCH sub-bands form the PDSCH sub-band set; and in this exemplary embodiment, the PDSCHBW is a size of the frequency resources occupied by the PDSCH, and is an integer greater than 0; floor represents rounding down;

a PDSCH sub-band definition 2: the PDSCH sub-bands are a segment of frequency resources; a starting point of the PDSCH sub-band set is the first RB of frequency resources occupied by the PDSCH, and ceil(PDSCHBW/k2) PDSCH sub-bands among all PDSCH sub-bands in the PDSCH sub-band set have a bandwidth of k2; frequency resources of the ceil(PDSCHBW/k2) PDSCH sub-bands are not overlapped, and the ceil(PDSCHBW/k2) PDSCH sub-bands form the PDSCH sub-band set; if the PDSCHBW/k2 is not an integer, at least one of the PDSCH sub-bands includes one or more RBs except the frequency resources occupied by the PDSCH; and in this exemplary embodiment, ceil represents rounding up;

a PDSCH sub-band definition 3: the PDSCH sub-bands are a segment of frequency resources; an end point of the PDSCH sub-band set is the last RB of frequency resources occupied by the PDSCH, and floor(PDSCHBW/k2) PDSCH sub-bands among all PDSCH sub-bands in the PDSCH sub-band set have a bandwidth of k2; if the PDSCHBW/k2 is not an integer, remaining RBs of the PDSCH except RBs occupied by the floor(PDSCHBW/k2) PDSCH sub-bands form one sub-band, and frequency resources of the floor (PDSCHBW/k2)+1 PDSCH sub-bands are not overlapped, and the floor(PDSCHBW/k2)+1 PDSCH sub-bands form the PDSCH sub-band set; if the PDSCHBW/k2 is an integer, frequency resources of the floor(PDSCHBW/k2) PDSCH sub-bands are not overlapped, and the floor(PDSCHBW/k2) PDSCH sub-bands form the PDSCH sub-band set; and in this exemplary embodiment, the PDSCHBW is a size of the frequency resources occupied by the PDSCH;

a PDSCH sub-band definition 4: the PDSCH sub-bands are a segment of frequency resources; an end point of the PDSCH sub-band set is the last RB of frequency resources occupied by the PDSCH, and ceil(PDSCHBW/k2) PDSCH sub-bands among all PDSCH sub-bands in the PDSCH sub-band set have a bandwidth of k2; frequency resources of the ceil(PDSCHBW/k2) PDSCH sub-bands are not overlapped, and the ceil(PDSCHBW/k2) PDSCH sub-bands form the PDSCH sub-band set; if the PDSCHBW/k2 is not an integer, at least one of the PDSCH sub-bands includes one or more RBs except the frequency resources occupied by the PDSCH, and in this exemplary embodiment, ceil represents rounding up;

a PDSCH sub-band definition 5: the PDSCH sub-bands are a segment of frequency resources; a sub-band in the sub-band set S1 on the system bandwidth is a sub-band in the PDSCH sub-band set when and only when frequency resources occupied by the sub-band are overlapped with frequency resources occupied by the PDSCH.

In an exemplary embodiment, the CSI on the sub-band set S2 may include at least one of:

A1: the sub-band set S2 has K2 sub-bands; for each sub-band, the CSI includes one precoding matrix index set I for indicating precoding matrixes, and one CQI or two CQIs, and in this exemplary embodiment, the precoding matrix index set I includes an index i, or a pair of precoding matrix indexes (i1, i2), or three precoding matrix indexes (i1, i2, i3);

A2: the sub-band set S2 has K2 sub-bands; for each sub-band, the CSI includes one CQI or two CQIs;

A3: the sub-band set S2 has K2 sub-bands; for all the K2 sub-bands, the CSI includes one precoding matrix index set I for indicating precoding matrixes;

A4: the sub-band set S2 has K2 sub-bands; for all the K2 sub-bands, the CSI includes one CQI or a pair of CQIs;

A5: M shielded sub-bands or M sub-bands which are not suitable for downlink data transmission are selected from the sub-band set S2; for all the M sub-bands, the CSI includes one precoding matrix index set I for indicating precoding matrixes, and in this exemplary embodiment, a precoding matrix index is used for providing frequency resources and spatial resources occupied by an interference signal;

A6: M shielded sub-bands or M sub-bands which are not suitable for downlink data transmission are selected from the sub-band set S2; for all sub-bands in the K2 sub-bands except the M sub-bands, the CSI includes one CQI or a pair of CQIs;

A7: M shielded sub-bands or M sub-bands which are not suitable for downlink data transmission are selected from the sub-band set S2; for all sub-bands in the K2 sub-bands except the M sub-bands, the CSI includes one precoding matrix index set I for indicating precoding matrixes.

In this exemplary embodiment, K2 and M are integers greater than 1, and M is less than K2; i, i1, i2 and i3 are positive integers greater than or equal to 0.

In an exemplary embodiment, the second node may be a terminal, and the first node may be a base station.

According to another exemplary embodiment of the disclosure, a method for acquiring CSI is also provided, which may include the following acts. A first node sends to a second node a first-type signal and a second-type signal, or a second-type signal. The first node receives CSI fed back by the second node. In this exemplary embodiment, the CSI may be determined by the second node according to measurement based on the first-type signal and the second-type signal, or according to measurement based on the second-type signal. The first-type signal may be a measurement RS, and the second-type signal may include at least one of: a demodulation RS and a data sharing channel signal.

In an exemplary embodiment, the second node may be the terminal, and the first node may be the base station.

According to an exemplary embodiment of the disclosure, an apparatus for acquiring CSI is also provided, which may be applied to the second node and may include a receiving module, an acquiring module and a feedback module. The receiving module is configured to receive a first-type signal and/or a second-type signal sent by a first node. The acquiring module is configured to acquire CSI based on measurement of the first-type signal and the second-type signal, or based on measurement of the second-type signal only. In this exemplary embodiment, the first-type signal may include a measurement RS, and the second-type signal may include one of: a demodulation RS, a data sharing channel signal, and a signal combination of the data sharing channel signal and the demodulation RS. The feedback module is configured to feed back the CSI to the first node.

According to another exemplary embodiment of the disclosure, an apparatus for acquiring CSI is provided, which may be applied to the first node and may include a sending module and a receiving module. The sending module is configured to send to a second node a first-type signal and a second-type signal, or a second-type signal. The receiving module is configured to receive CSI fed back by the second node. In this exemplary embodiment, the CSI may be determined by the second node according to measurement based on the first-type signal and the second-type signal, or according to measurement based on the second-type signal; the first-type signal may be a measurement RS, and the second-type signal may include at least one of: a demodulation RS and a data sharing channel signal.

According to some embodiments of the disclosure, the second node receives the first-type signal and/or the second-type signal sent by the first node; the second node acquires the CSI based on measurement of the first-type signal and the second-type signal, or based on measurement of the second-type signal only, the first-type signal may include the measurement the RS, and the second-type signal may include one of: the demodulation RS, the data sharing channel signal, and the signal combination of the data sharing channel signal and the demodulation RS; and the second node feeds back the CSI to the first node. In such a manner, a problem in the related technology that CSI measurement accuracy is not high and CSI feedback on a data sharing channel is not timely may be solved, thereby realizing adaptive coding and modulation better and improving the system throughput.

BRIEF DESCRIPTION OF THE DRAWINGS

The accompanying drawings described here are used for providing a deeper understanding of the disclosure, and constitute a part of the application; schematic exemplary embodiments of the disclosure and description thereof are used for illustrating the disclosure and not intended to form any limit to the disclosure. In the accompanying drawings.

DETAILED DESCRIPTION OF THE EMBODIMENTS

The disclosure is elaborated below with reference to the accompanying drawings and exemplary embodiments. Note that, the exemplary embodiments of the disclosure and the characteristics in the exemplary embodiments may be combined under the condition of no conflicts.

Figure 1:
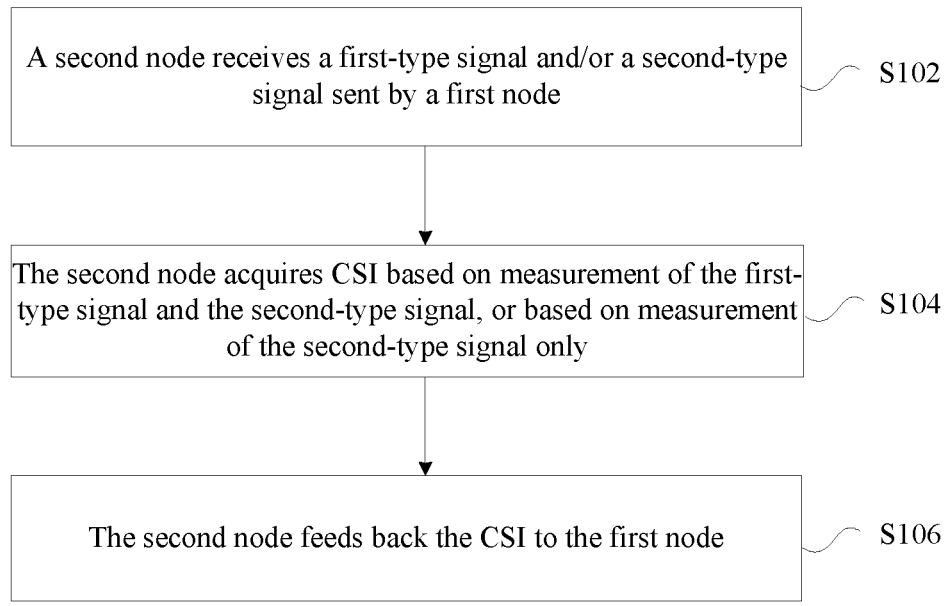
FIG. 1 is a flowchart of a method for acquiring CSI according to an exemplary embodiment of the disclosure.

In the present exemplary embodiment, a method for acquiring CSI is provided. FIG. 1 is a flowchart of the method for acquiring CSI according to an exemplary embodiment of the disclosure. As shown in FIG. 1, the flow includes the following acts.

At act S102, a second node may receive a first-type signal and/or a second-type signal sent by a first node.

At act S104, the second node may acquire CSI based on measurement of the first-type signal and the second-type signal, or based on measurement of the second-type signal only. In this exemplary embodiment, the first-type signal may include a measurement RS, and the second-type signal may include one of: a demodulation RS, a data sharing channel signal, and a signal combination of the data sharing channel signal and the demodulation RS.

At act S106, the second node may feed back the CSI to the first node.

Through the above acts, the second node acquires the CSI based on the measurement of the first-type signal and/or the second-type signal received from the first node, and sends the acquired CSI to the second node. In such a manner, a problem in the related technology that CSI measurement accuracy is not high and CSI feedback on a data sharing channel is not timely may be solved, thereby improving the accuracy of CSI measurement.

The above act S104 relates to acquisition, performed by the second node, of the CSI based on the measurement of the first-type signal and/or the second-type signal, or based on the measurement of the second-type signal only. It should be noted that there may be many modes of acquiring the CSI through act S104, which are illustrated below. In an exemplary embodiment, the modes of acquiring the CSI may include:

Mode 1: acquiring the CSI according to the first-type signal and the first data signal, or according to the first-type signal and the demodulation RS; and in this exemplary embodiment, the first data signal may be obtained by processing the received data sharing channel signal;

Mode 2: processing the received data sharing channel signal to obtain a first data signal; and acquiring the CSI according to the first-type signal, the first data signal and the demodulation RS;

Mode 3: acquiring the CSI according to the second-type signal; when the CSI is acquired in Mode 3, and the second-type signal is the data sharing channel signal, first the data sharing channel signal may be processed, and the CSI may be acquired according to the processed data sharing channel signal;

Mode 4: selecting a signal type from a set of candidate signals; and acquiring the CSI based on measurement of the selected signal type.

There may also be many sub-modes for the Mode 1 of acquiring the CSI, which are illustrated below. In an exemplary embodiment, the Mode 1 of acquiring the CSI may include the following sub-modes:

Sub-mode 1a: performing measurement based on the first-type signal to acquire the first CSI; performing measurement based on the first data signal or the demodulation RS to acquire the second CSI; and acquiring the CSI according to the first CSI and the second CSI;

Sub-mode 1b: performing measurement based on the first-type signal to acquire the third CSI; performing measurement based on the first data signal and the first-type signal, or based on the demodulation RS and the first-type signal to obtain the fourth CSI; and acquiring the CSI according to the third CSI and the fourth CSI;

Sub-mode 1c: performing channel measurement based on a non-zero power measurement RS to obtain the first measurement result; performing interference measurement based on the first data signal or the demodulation RS to obtain the second measurement result; and acquiring the CSI according to the first measurement result and the second measurement result;

Sub-mode 1d: performing channel measurement based on a non-zero power measurement RS to obtain the third measurement result; performing interference measurement based on the first data signal and a zero power measurement RS, or based on the demodulation RS and the zero power measurement RS to obtain the fourth measurement result; and acquiring the CSI according to the third measurement result and the fourth measurement result;

Sub-mode 1e: performing channel measurement based on the first data signal or the demodulation RS to obtain the fifth measurement result; performing interference measurement based on the first data signal and a zero power measurement RS, or based on the demodulation RS and the zero power measurement RS to obtain the sixth measurement result; and acquiring the CSI according to the fifth measurement result and the sixth measurement result.

There may also be many sub-modes under the Mode 2 of acquiring the CSI, which are illustrated below. In an exemplary embodiment, the Mode 2 of acquiring the CSI may include the following sub-modes:

Sub-mode 2a: performing measurement based on the first-type signal to acquire the fifth CSI; performing measurement based on the first data signal and the demodulation RS to acquire the sixth CSI; and acquiring the CSI according to the fifth CSI and the sixth CSI;

Sub-mode 2b: performing measurement based on the first-type signal to acquire the seventh CSI; performing measurement based on the first data signal, the demodulation RS and the first-type signal to obtain the eighth CSI; and acquiring the CSI according to the seventh CSI and the eighth CSI;

Sub-mode 2c: performing channel measurement based on a non-zero power measurement RS to obtain the seventh measurement result; performing interference measurement based on the first data signal and the demodulation RS to obtain the eighth measurement result; and acquiring the CSI according to the seventh measurement result and the eighth measurement result;

Sub-mode 2d: performing channel measurement based on a non-zero power measurement RS to obtain the ninth measurement result; performing interference measurement based on the first-type signal, the demodulation RS and a zero power measurement RS to obtain the tenth measurement result; and acquiring the CSI according to the ninth measurement result and the tenth measurement result;

Sub-mode 2e: performing channel measurement based on the first data signal and the demodulation RS to obtain the eleventh measurement result; performing interference measurement based on the first data signal, the demodulation RS and a zero power measurement RS to obtain the twelfth measurement result; and acquiring the CSI according to the eleventh measurement result and the twelfth measurement result.

There may also be many sub-modes of the Mode 3 of acquiring the CSI, which are illustrated below. In an exemplary embodiment, the Mode 3 of acquiring the CSI may include the following sub-modes:

Sub-mode 3a: processing the received data sharing channel signal to obtain a first data signal; and performing measurement based on the demodulation RS to acquire the ninth CSI; performing measurement based on the first data signal to acquire the tenth CSI; and acquiring the CSI according to the ninth CSI and the tenth CSI;

Sub-mode 3b: performing channel measurement and interference measurement based on the demodulation RS to obtain the thirteenth measurement result; correcting channel measurement based on the first data signal to obtain the fourteenth measurement result; and acquiring the CSI according to the thirteenth measurement result and the fourteenth measurement result;

Sub-mode 3c: performing channel measurement and interference measurement based on the demodulation RS to obtain the fifteenth measurement result; and acquiring the CSI according to the fifteenth measurement result.

In an exemplary embodiment, the measurement based on the first-type signal and the second-type signal, or the measurement based on the second-type signal only, which is performed by the second node, may include at least one of: channel measurement and interference measurement.

When the CSI is acquired according to the Mode 4, in an exemplary embodiment, the set of candidate signals may be:

a candidate signal set 1 including: the measurement RS and the demodulation RS;

a candidate signal set 2 including: the measurement RS, and a combination of the demodulation RS and the first data signal;

a candidate signal set 3 including: a combination of the measurement RS and the demodulation RS, and a combination of the measurement RS and the first data signal, and in this exemplary embodiment, the first data signal may be obtained by processing the data sharing channel signal;

a candidate signal set 4 including: the measurement RS, the demodulation RS, and the first data signal;

a candidate signal set 5 including: the demodulation RS and the first data signal.

In an exemplary embodiment, when a preset condition is satisfied, the first data signal may be selected from the set of candidate signals, and the CSI may be acquired based on the first data signal. In this exemplary embodiment, the preset condition may be one of the followings: an SINR before the data sharing channel signal is demodulated is greater than or equal to a preset threshold; a sum of absolute values of log likelihood ratios of data obtained by decoding the data sharing channel signal is greater than or equal to a preset threshold; an estimated data error rate output after the data sharing channel signal is decoded is less than a preset threshold; an SINR of a pilot frequency on an antenna port is less than a preset threshold; data of the data sharing channel signal is received correctly.

In an exemplary embodiment, the first data signal may be at least one of: a soft-output data signal after decoding, a soft-output data signal after demodulation and a data signal before demodulation.

In an exemplary embodiment, the CSI may be at least one of: a first-type CSI and a second-type CSI. In this exemplary embodiment, the first-type CSI may include at least one of: a CQI, a PMI, an RI, channel matrix indicator information, beam indication information, antenna selection indication information, error level indication information, repetitions level indication information, and power parameter level indication information. The second-type CSI may include at least one of: interference resource location indication information, interference channel indication information, interference channel correlation matrix indication information, transmission parameters of an interference signal, and interference level indication information. In another exemplary embodiment, the CSI may be a report set of CSI report modes. The report set may be at least one of: a combination of a wide-band CSI report set and a PDSCH sub-band CSI report set, and a PDSCH sub-band CSI report set.

In an exemplary embodiment, the wide-band CSI report set may be used for indicating the CSI on the sub-band set S1 on the system bandwidth. In this exemplary embodiment, the sub-band set S1 on the system bandwidth may include K1 sub-bands. The PDSCH sub-band CSI report set may be used for indicating the CSI on the sub-band set S2 corresponding to a data sharing channel. The sub-band set S2 may include K2 sub-bands, where the k1 and the k2 are integers greater than 1.

In an exemplary embodiment, a sub-band size k1 of the sub-band set S1 on the system bandwidth may be determined according to the system bandwidth; a sub-band size k2 of the sub-band set S2 of PDSCH sub-bands may be determined according to a bandwidth occupied by the PDSCH; where the k1 and the k2 are integers greater than 1.

In an exemplary embodiment, the sub-band size k2 of the sub-band set S2 of the PDSCH sub-bands may increase along with increase of the bandwidth occupied by the PDSCH.

There may be many modes of determining the PDSCH sub-band. In an exemplary embodiment, the PDSCH sub-bands may be determined according to at least one of the following definitions:

a PDSCH sub-band definition 1: the PDSCH sub-bands are a segment of frequency resources; a starting point of the PDSCH sub-band set is the first RB of frequency resources occupied by the PDSCH, and floor(PDSCHBW/k2) PDSCH sub-bands among all PDSCH sub-bands in the PDSCH sub-band set have a bandwidth of k2; if the PDSCHBW/k2 is not an integer, remaining RBs of the PDSCH except RBs occupied by the floor(PDSCHBW/k2) PDSCH sub-bands form one sub-band, and frequency resources of the floor(PDSCHBW/k2)+1 PDSCH sub-bands are not overlapped, and the floor(PDSCHBW/k2)+1 PDSCH sub-bands form the PDSCH sub-band set; if the PDSCHBW/k2 is an integer, frequency resources of the floor(PDSCHBW/k2) PDSCH sub-bands are not overlapped, and the floor(PDSCHBW/k2) PDSCH sub-bands form the PDSCH sub-band set; and in this exemplary embodiment, the PDSCHBW is a size of the frequency resources occupied by the PDSCH, and is an integer greater than 0; floor represents rounding down;

a PDSCH sub-band definition 2: the PDSCH sub-bands are a segment of frequency resources; a starting point of the PDSCH sub-band set is the first RB of frequency resources occupied by the PDSCH, and ceil(PDSCHBW/k2) PDSCH sub-bands among all PDSCH sub-bands in the PDSCH sub-band set have a bandwidth of k2; frequency resources of the ceil(PDSCHBW/k2) PDSCH sub-bands are not overlapped, and the ceil(PDSCHBW/k2) PDSCH sub-bands form the PDSCH sub-band set; if the PDSCHBW/k2 is not an integer, at least one of the PDSCH sub-bands includes one or more RBs except the frequency resources occupied by the PDSCH; and in this exemplary embodiment, ceil represents rounding up;

a PDSCH sub-band definition 3: the PDSCH sub-bands are a segment of frequency resources; an end point of the PDSCH sub-band set is the last RB of frequency resources occupied by the PDSCH, and floor(PDSCHBW/k2) PDSCH sub-bands among all PDSCH sub-bands in the PDSCH sub-band set have a bandwidth of k2; if the PDSCHBW/k2 is not an integer, remaining RBs of the PDSCH except RBs occupied by the floor(PDSCHBW/k2) PDSCH sub-bands form one sub-band, and frequency resources of the floor(PDSCHBW/k2)+1 PDSCH sub-bands are not overlapped, and the floor(PDSCHBW/k2)+1 PDSCH sub-bands form the PDSCH sub-band set; if the PDSCHBW/k2 is an integer, frequency resources of the floor(PDSCHBW/k2) PDSCH sub-bands are not overlapped, and the floor(PDSCHBW/k2) PDSCH sub-bands form the PDSCH sub-band set; and in this exemplary embodiment, the PDSCHBW is a size of the frequency resources occupied by the PDSCH;

a PDSCH sub-band definition 4: the PDSCH sub-bands are a segment of frequency resources; an end point of the PDSCH sub-band set is the last RB of frequency resources occupied by the PDSCH, and ceil(PDSCHBW/k2) PDSCH sub-bands among all PDSCH sub-bands in the PDSCH sub-band set have a bandwidth of k2; frequency resources of the ceil(PDSCHBW/k2) PDSCH sub-bands are not overlapped, and the ceil(PDSCHBW/k2) PDSCH sub-bands form the PDSCH sub-band set; if the PDSCHBW/k2 is not an integer, at least one of the PDSCH sub-bands includes one or more RBs except the frequency resources occupied by the PDSCH, and in this exemplary embodiment, ceil represents rounding up;

a PDSCH sub-band definition 5: the PDSCH sub-bands are a segment of frequency resources; a sub-band in the sub-band set S1 on the system bandwidth is a sub-band in the PDSCH sub-band set when and only when frequency resources occupied by the sub-band are overlapped with frequency resources occupied by the PDSCH.

In an exemplary embodiment, the CSI on the sub-band set S2 may include:

A1: the sub-band set S2 has K2 sub-bands; for each sub-band, the CSI includes one precoding matrix index set I for indicating precoding matrixes, and one CQI or two CQIs, and in this exemplary embodiment, the precoding matrix index set I includes an index i, or a pair of precoding matrix indexes (i1, i2), or three precoding matrix indexes (i1, i2, i3);

A2: the sub-band set S2 has K2 sub-bands; for each sub-band, the CSI includes one CQI or two CQIs;

A3: the sub-band set S2 has K2 sub-bands; for all the K2 sub-bands, the CSI includes one precoding matrix index set I for indicating precoding matrixes;

A4: the sub-band set S2 has K2 sub-bands; for all the K2 sub-bands, the CSI includes one CQI or a pair of CQIs;

A5: M shielded sub-bands or M sub-bands which are not suitable for downlink data transmission are selected from the sub-band set S2; for all the M sub-bands, the CSI includes one precoding matrix index set I for indicating precoding matrixes, and in this exemplary embodiment, a precoding matrix index is used for providing frequency resources and spatial resources occupied by an interference signal;

A6: M shielded sub-bands or M sub-bands which are not suitable for downlink data transmission are selected from the sub-band set S2; for all sub-bands in the K2 sub-bands except the M sub-bands, the CSI includes one CQI or a pair of CQIs;

A7: M shielded sub-bands or M sub-bands which are not suitable for downlink data transmission are selected from the sub-band set S2; for all sub-bands in the K2 sub-bands except the M sub-bands, the CSI includes one precoding matrix index set I for indicating precoding matrixes; and in this exemplary embodiment, K2 and M are integers greater than 1, and M is less than K2; i, i1, i2 and i3 are positive integers greater than or equal to 0.

In an exemplary embodiment, the second node may be a terminal, and the first node may be a base station.

In the present exemplary embodiment, an apparatus for acquiring CSI is also provided, which is used for implementing the above embodiments and exemplary embodiments. The exemplary embodiments which have been elaborated will not be repeated herein. The term "module" used below can realize a combination of software and/or hardware with an intended function. Although the apparatus described in the following exemplary embodiment is realized through software better, the realization through hardware or a combination of software and hardware is possible and conceived.

Figure 2:
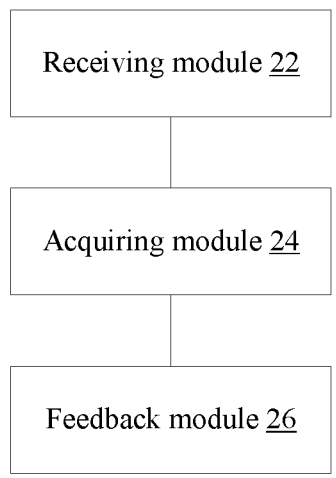
FIG. 2 is a structure diagram of an apparatus for acquiring CSI according to an exemplary embodiment of the disclosure.

FIG. 2 is a structure diagram of the apparatus for acquiring CSI according to an exemplary embodiment of the disclosure; the apparatus may be applied to the second node. As shown in FIG. 2, the apparatus may include a receiving module 22, an acquiring module 24 and a feedback module 26. The receiving module 22 may be configured to receive a first-type signal and/or a second-type signal sent by a first node. The acquiring module 24 may be configured to acquire CSI based on measurement of the first-type signal and the second-type signal, or based on measurement of the second-type signal only. In this exemplary embodiment, the first-type signal may include the measurement RS, and the second-type signal may include one of: the demodulation RS, the data sharing channel signal, and the signal combination of the data sharing channel signal and the demodulation RS. The feedback module 26 may be configured to feed back the CSI to the first node.

Figure 3:
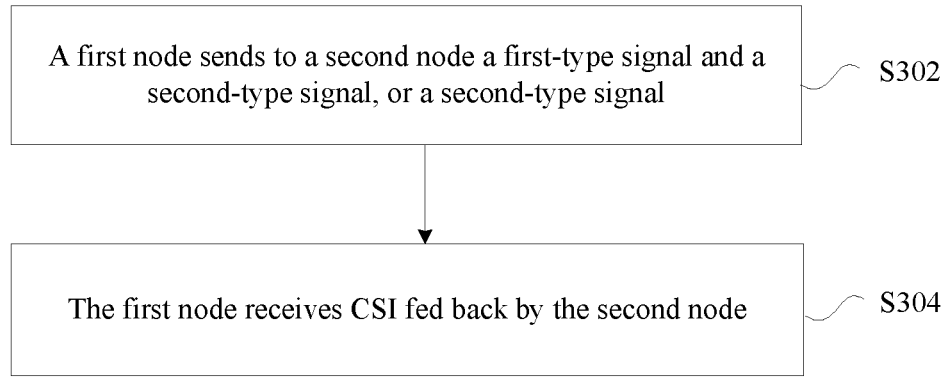
FIG. 3 is a first flowchart of the method for acquiring CSI according to an exemplary embodiment of the disclosure.

In another exemplary embodiment, a method for acquiring CSI is provided. FIG. 3 is a first flowchart of the method for acquiring CSI according to an exemplary embodiment of the disclosure. As shown in FIG. 3, the flow may include the following acts.

At act S302, a first node sends to a second node a first-type signal and a second-type signal, or a second-type signal.

At act S304, the first node receives CSI fed back by the second node. In this exemplary embodiment, the CSI may be determined by the second node according to measurement based on the first-type signal and the second-type signal, or according to measurement based on the second-type signal; the first-type signal may be the measurement RS, and the second-type signal may include at least one of: the demodulation RS and the data sharing channel signal.

Through the above acts, the first node receives the CSI which is acquired by the second node based on the measurement of the first-type signal and/or the second-type signal received from the first node. In such a manner, a problem in the related technology that CSI measurement accuracy is not high and CSI feedback on a data sharing channel is not timely may be solved, thereby improving the accuracy of CSI measurement.

In an exemplary embodiment, the second node may be a terminal, and the first node may be a base station.

In the present exemplary embodiment, an apparatus for acquiring CSI is also provided, which is used for implementing the above embodiments and exemplary embodiments. The exemplary embodiments which have been elaborated will not be repeated herein. The term "module" used below can realize a combination of software and/or hardware with an intended function. Although the apparatus described in the following exemplary embodiment is realized through software better, the realization through hardware or a combination of software and hardware is possible and conceived.

Figure 4:
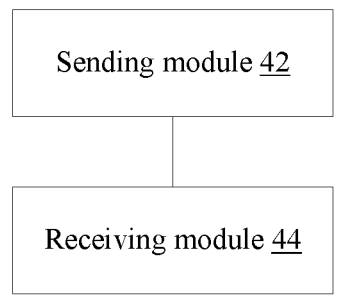
FIG. 4 is a first structure diagram of the apparatus for acquiring CSI according to an exemplary embodiment of the disclosure.

FIG. 4 is a first structure diagram of the apparatus for acquiring CSI according to an exemplary embodiment of the disclosure. The apparatus may be applied to the first node. As shown in FIG. 4, the apparatus may include a sending module 42 and a receiving module 44. The sending module 42 may be configured to send to a second node a first-type signal and a second-type signal, or a second-type signal. The receiving module 44 may be configured to receive CSI fed back by the second node. In this exemplary embodiment, the CSI may be determined by the second node according to measurement based on the first-type signal and the second-type signal, or according to measurement based on the second-type signal. The first-type signal may be the measurement RS, and the second-type signal may include at least one of: the demodulation RS and the data sharing channel signal.

Note that, the above modules may be realized by software or hardware. For the latter, the modules may be realized by, but are not limited to, the following way: all of the above modules may be in the same processor; or, the above modules may be respectively in a first processor, a second processor, a third processor, and so on.

Aiming at a problem in the related technology, an elaboration is given below in combination with the exemplary embodiment; the above exemplary embodiments and optional implementation modes thereof may be combined in the present exemplary embodiment. In the following exemplary embodiments, the second node may be a terminal, and the first node may be a base station.

First Exemplary Embodiment (Embodiment of PDSCH Sub-Band)

Sub-Embodiment 1-1

Figure 5:
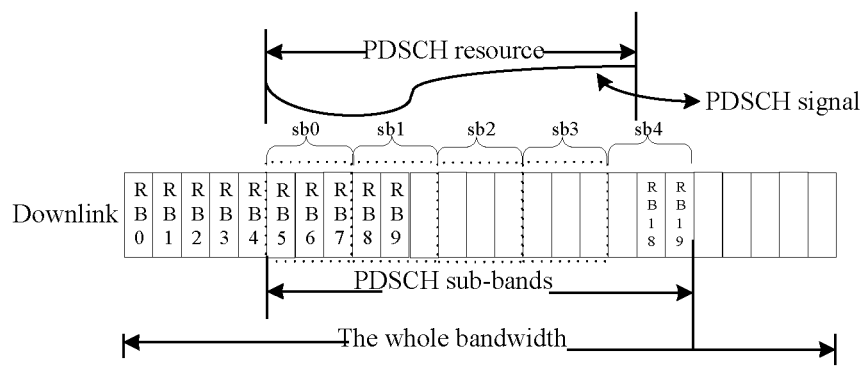
FIG. 5 is a structure diagram of a PDSCH sub-band according to an exemplary embodiment of the disclosure.

FIG. 5 is a structure diagram of the PDSCH sub-band according to an exemplary embodiment of the disclosure. In the PDSCH sub-band shown in FIG. 5, the second node may receive the first-type signal and the second-type signal sent by a first transmission node. The second node may determine the CSI based on the measurement of the first-type signal and the second-type signal. In an exemplary embodiment, the second node may perform receiving processing to the data sharing channel signal. The CSI may be acquired according to the first-type signal and the second-type signal. The first-type signal may be a measurement RS, and the second-type signal may be a data signal on which the receiving processing is performed. More specifically, the second node may perform measurement based on the measurement RS to acquire the first CSI, may perform measurement based on the data signal on which the receiving processing is performed to acquire the second CSI, and may acquire the final CSI according to the first CSI and the second CSI.

The second node may feed back the CSI to the first node. The CSI may include wide-band CSI and PDSCH sub-band CSI. The wide-band CSI is used for indicating the CSI assumed based on transmission on the whole system bandwidth. The PDSCH sub-band CSI is used for indicating the CSI assumed based on transmission on PDSCH sub-bands Sb0-Sb4. In the present exemplary embodiment, the PDSCH sub-band CSI is the interference channel indication information for indicating interference channel information on the PDSCH sub-band. In the present exemplary embodiment, the PDSCH occupies 13 RBs, e.g., RB5-RB17. Taking RB5 as the starting point, and according to a PDSCH sub-band size k2 which is configured to be 3 RBs, the PDSCH may be divided into ceil(13/3)=5 PDSCH sub-bands, namely Sb0-Sb4. The bandwidth of each PDSCH sub-band is 3 RBs. The second node may perform measurement on the newly defined PDSCH sub-bands and may feed back the CSI, thereby achieving the objective of reflecting the channel state on the PDSCH more accurately and more timely.

Note that, in the present exemplary embodiment, that the PDSCH sub-band CSI is the interference channel indication information is only an example. The PDSCH sub-band CSI may alternatively be any one of the interference resource location indication information, the interference channel indication information, the interference channel correlation matrix indication information, the transmission parameters of the interference signal, the interference level indication information, the CQI, the PMI, the RI, the channel matrix indicator information, the beam indication information, the antenna selection indication information, the error level indication information, the repetitions level indication information, and the power parameter level indication information.

Sub-Embodiment 1-2

Figure 6:
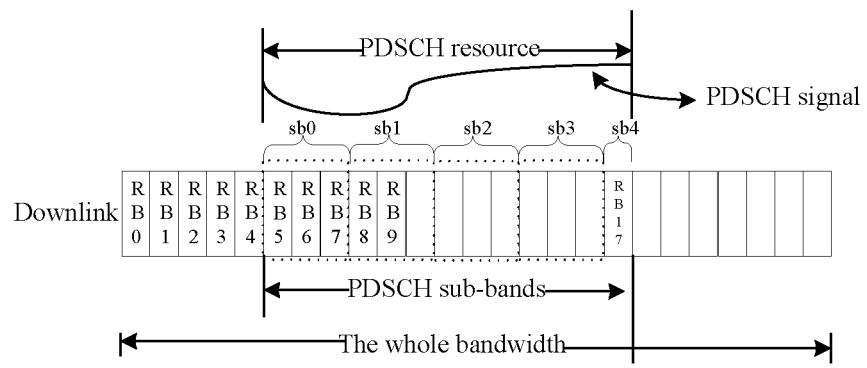
FIG. 6 is a first structure diagram of the PDSCH sub-band according to an exemplary embodiment of the disclosure.

FIG. 6 is a first structure diagram of the PDSCH sub-band according to an exemplary embodiment of the disclosure. In the PDSCH sub-band shown in FIG. 6, the second node may receive the first-type signal and the second-type signal sent by the first transmission node. The second node may determine the CSI based on the measurement of the first-type signal and the second-type signal. In an exemplary embodiment, the second node may perform receiving processing to the data sharing channel signal. The CSI may be acquired according to the first-type signal and the second-type signal. The first-type signal may be a measurement RS, and the second-type signal may be a data signal on which the receiving processing is performed. More specifically, the second node may perform measurement based on the measurement RS to acquire the first CSI, may perform measurement based on the data signal on which the receiving processing is performed to acquire the second CSI, and may acquire the final CSI according to the first CSI and the second CSI.

The second node may feed back the CSI to the first node. The CSI may include wide-band CSI and PDSCH sub-band CSI. The wide-band CSI is used for indicating the CSI assumed based on transmission on the whole system bandwidth. The PDSCH sub-band CSI is used for indicating the CSI assumed based on the PDSCH sub-band Sb0 transmission. In the present exemplary embodiment, the PDSCH occupies 13 RBs, e.g., RB5-RB17. Taking RB5 as the starting point, and according to a PDSCH sub-band size k2 which is configured to be 3 RBs, the PDSCH may be divided into floor(13/3)+1=5 PDSCH sub-bands, namely Sb0-Sb4. The bandwidth of floor(13/3)=4 PDSCH sub-bands is 3 RBs, and the bandwidth of one PDSCH sub-band, e.g., Sb4, is 1 RB.

The second node may perform measurement on the newly defined PDSCH sub-bands and feed back the CSI, thereby achieving the objective of reflecting the channel state on the PDSCH more accurately and more timely.

Sub-Mode 1-3

Figure 7:
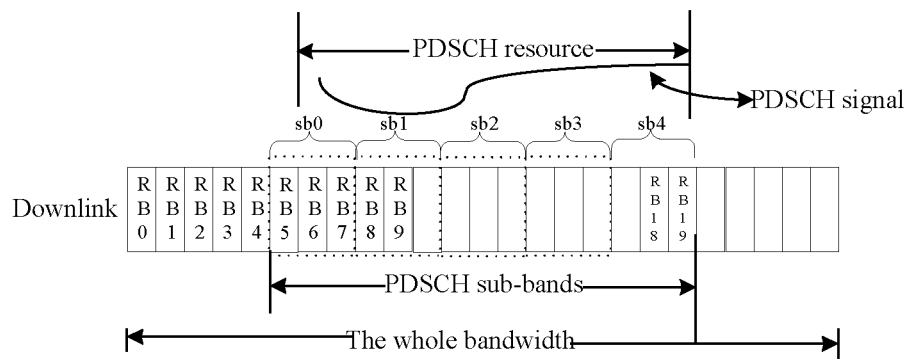
FIG. 7 is a second structure diagram of the PDSCH sub-band according to an exemplary embodiment of the disclosure.

FIG. 7 is a second structure diagram of the PDSCH sub-band according to an exemplary embodiment of the disclosure. In the PDSCH sub-band shown in FIG. 7, the second node may receive the first-type signal and the second-type signal sent by the first transmission node. The second node may determine the CSI based on the measurement of the first-type signal and the second-type signal. In an exemplary embodiment, the second node may perform receiving processing to the data sharing channel signal. The CSI may be acquired according to the first-type signal and the second-type signal. The first-type signal may be a measurement RS, and the second-type signal may be a data signal on which the receiving processing is performed. More specifically, the second node may perform measurement based on the measurement RS to acquire the first CSI, may perform measurement based on the data signal on which the receiving processing is performed to acquire the second CSI, and may acquire the final CSI according to the first CSI and the second CSI.

The second node may feed back the CSI to the first node. The CSI may be the PDSCH sub-band CSI. The PDSCH sub-band CSI is used for indicating the CSI assumed based on transmission on PDSCH sub-bands Sb0-Sb4 and the CSI assumed based on transmission on the PDSCH sub-band Sb2. In the present exemplary embodiment, the PDSCH occupies 14 RBs, e.g., RB6-RB19. Taking RB19 as the end point, and according to a PDSCH sub-band size k2 which is configured to be 3 RBs, the PDSCH may be divided into ceil(14/3)=5 PDSCH sub-bands, namely Sb0-Sb4. The bandwidth of each PDSCH sub-band is 3 RBs.

The second node may perform measurement on the newly defined PDSCH sub-bands and feed back the CSI, thereby achieving the objective of reflecting the channel state on the PDSCH more accurately and more timely.

Sub-Embodiment 1-4

Figure 8:
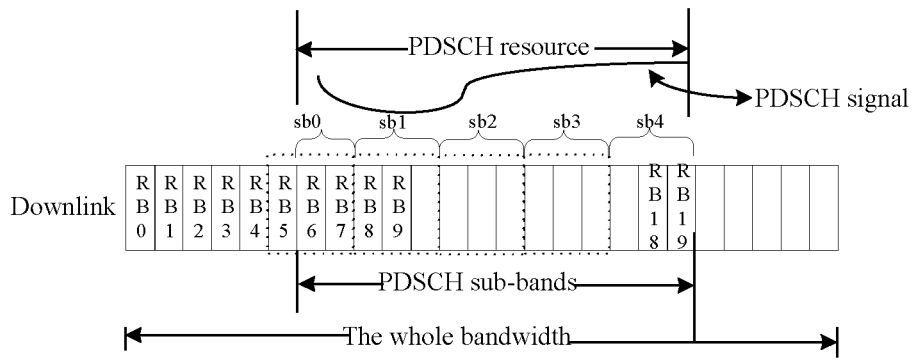
FIG. 8 is a third structure diagram of the PDSCH sub-band according to an exemplary embodiment of the disclosure.

FIG. 8 is a third structure diagram of the PDSCH sub-band according to an exemplary embodiment of the disclosure. In the PDSCH sub-band shown in FIG. 8, the second node may receive the first-type signal and the second-type signal sent by the first transmission node. The second node may determine the CSI based on the measurement of the first-type signal and the second-type signal. In an exemplary embodiment, the second node may perform receiving processing to the data sharing channel signal. The CSI may be acquired according to the first-type signal and the second-type signal. The first-type signal may be a measurement RS, and the second-type signal may be a data signal on which the receiving processing is performed. More specifically, the second node may perform measurement based on the measurement RS to acquire the first CSI, may perform measurement based on the data signal on which the receiving processing is performed to acquire the second CSI, and may acquire the final CSI according to the first CSI and the second CSI.

The second node may feed back the CSI to the first node. The CSI may be the PDSCH sub-band CSI. The PDSCH sub-band CSI is used for indicating the CSI assumed based on transmission on PDSCH sub-bands Sb0-Sb4 and the CSI assumed based on transmission on the PDSCH sub-band Sb2. In the present exemplary embodiment, the PDSCH occupies 14 RBs, e.g., RB6-RB19. Taking RB19 as the end point, and according to a PDSCH sub-band size k2 which is configured to be 3 RBs, the PDSCH may be divided into floor(14/3)+1=5 PDSCH sub-bands, namely Sb0-Sb4. The bandwidth of each PDSCH sub-band is 3 RBs. The bandwidth of floor(13/3)=4 PDSCH sub-bands is 3 RBs, and the bandwidth of one PDSCH sub-band, e.g., Sb0, is 2 RBs.

The second node may perform measurement on the newly defined PDSCH sub-bands and feed back the CSI, thereby achieving the objective of reflecting the channel state on the PDSCH more accurately and more timely.

Sub-Mode 1-5

Figure 9:
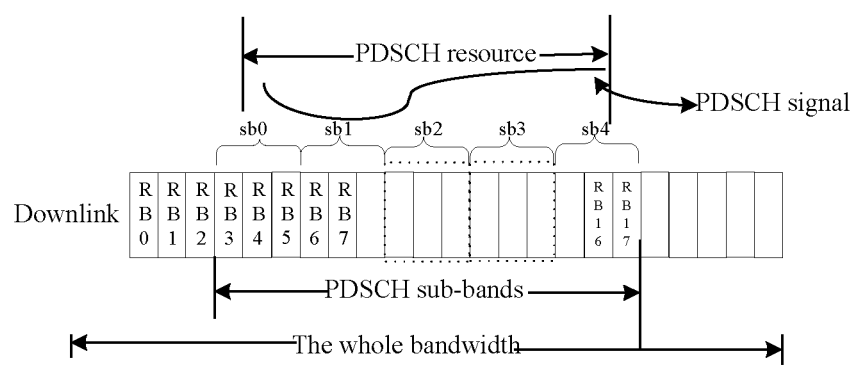
FIG. 9 is a fourth structure diagram of the PDSCH sub-band according to an exemplary embodiment of the disclosure.

FIG. 9 is a fourth structure diagram of the PDSCH sub-band according to an exemplary embodiment of the disclosure. In the PDSCH sub-band shown in FIG. 9, the second node may receive the first-type signal and the second-type signal sent by the first transmission node. The second node may determine the CSI based on the measurement of the first-type signal and the second-type signal. In an exemplary embodiment, the second node may perform receiving processing to the data sharing channel signal. The CSI may be acquired according to the first-type signal and the second-type signal. The first-type signal may be a measurement RS, and the second-type signal may be a data signal on which the receiving processing is performed. More specifically, the second node may perform measurement based on the measurement RS to acquire the first CSI, may perform measurement based on the data signal on which the receiving processing is performed to acquire the second CSI, and may acquire the final CSI according to the first CSI and the second CSI.

The second node may feed back the CSI to the first node. The CSI may be the PDSCH sub-band CSI. The PDSCH sub-band CSI is used for indicating the CSI assumed based on transmission on PDSCH sub-bands Sb0-Sb4 and the CSI assumed based on transmission on the PDSCH sub-band Sb2. In the present exemplary embodiment, the PDSCH occupies 13 RBs, e.g., RB4-RB16. At the same time, the sub-bands Sb0-Sb4 may be the sub-bands divided based on the system bandwidth. Each of the sub-bands Sb0 and Sb4 divided based on the system bandwidth has one RB belonging to frequency domain resources of the PDSCH.

The PDSCH sub-bands may be defined based on the sub-bands divided based on the system bandwidth, which may be compatible with the related technical standards simply and easily. The second node may perform measurement on the newly defined PDSCH sub-bands and feed back the CSI, thereby achieving the objective of reflecting the channel state on the PDSCH more accurately and more timely.

Note that, the modes that the second node performs measurement and acquires the CSI in the first exemplary embodiment are not limited to the modes described in the sub-embodiments. For example, the second node may also perform measurement based on the measurement RS to acquire the first CSI, perform measurement based on the demodulation RS, or based on the data signal on which receiving processing is performed and the measurement RS to acquire the second CSI, and acquire the final CSI according to the first CSI and the second CSI. The second node may also perform channel measurement based on a non-zero power measurement RS, and perform interference measurement based on the data signal on which receiving processing is performed or the demodulation RS, and acquire the CSI according to the measurement result, and so on. Moreover, the second node may also determine the CSI based on the measurement of the second-type signal.

Exemplary Embodiment of Measurement

In the second exemplary embodiment, the second node may receive the first-type signal and the second-type signal sent by the first transmission node. The second node may determine the CSI based on the measurement of the first-type signal and the second-type signal. The first-type signal may be a measurement RS, and the second-type signal may be one of: a demodulation RS, a data sharing channel signal, and a signal combination of the data sharing channel signal and the demodulation RS. The second node may feed back the CSI to the first node. More specifically, the second node may perform receiving processing to the data sharing channel signal. The CSI may be acquired according to the first-type signal and the second-type signal. The first-type signal may be the measurement RS, and the second-type signal may be the data signal on which the receiving processing is performed or the demodulation RS. The second exemplary embodiment includes multiple sub-embodiments as follows.

Sub-Embodiment 2-1

The second node may perform measurement based on the measurement RS to acquire the first CSI, may perform measurement based on the data signal on which the receiving processing is performed or the demodulation RS to acquire the second CSI, and may acquire the final CSI according to the first CSI and the second CSI. The second node may feed back the CSI to the first node. Using the demodulation RS of the data sharing channel to perform measurement may increase the density of measuring the pilot frequency, improve the measurement accuracy, and acquire more accurate CSI. Performing measurement based on the data signal on which receiving processing is performed may also improve the measurement accuracy.

Sub-Embodiment 2-2

The second node may perform measurement based on the measurement RS to acquire the first CSI, may perform measurement based on the data signal on which the receiving processing is performed or the demodulation RS, and the measurement RS to acquire the second CSI, and may acquire the final CSI according to the first CSI and the second CSI. The second node may feed back the CSI to the first node. Using the demodulation RS of the data sharing channel to perform measurement may increase the density of measuring the pilot frequency, improve the measurement accuracy, and acquire more accurate CSI. Performing measurement based on the data signal on which receiving processing is performed may also improve the measurement accuracy.

Sub-Embodiment 2-3

The second node performs channel measurement based on a non-zero power measurement RS, performs interference measurement based on the data signal on which receiving processing is performed or the demodulation RS, and acquires the CSI according to the measurement result. The second node may feed back the CSI to the first node. Using the demodulation RS of the data sharing channel to perform measurement may increase the density of measuring the pilot frequency, improve the measurement accuracy, and acquire more accurate CSI. Performing measurement based on the data signal on which receiving processing is performed may also improve the measurement accuracy.

Sub-Embodiment 2-4

The second node performs channel measurement based on a non-zero power measurement RS, performs interference measurement based on the data signal on which receiving processing is performed or the demodulation RS, and the zero power measurement RS, and acquires the CSI according to the measurement result. The second node may feed back the CSI to the first node. Using the demodulation RS of the data sharing channel to perform measurement may increase the density of measuring the pilot frequency, improve the measurement accuracy, and acquire more accurate CSI. Performing measurement based on the data signal on which receiving processing is performed may also improve the measurement accuracy.

Sub-Embodiment 2-5

The second node performs channel measurement based on the data signal on which receiving processing is performed or the demodulation RS, performs interference measurement based on the data signal on which receiving processing is performed or the demodulation RS, and the zero power measurement RS, and acquires the CSI according to the measurement result. The second node may feed back the CSI to the first node. Using the demodulation RS of the data sharing channel to perform measurement may increase the density of measuring the pilot frequency, improve the measurement accuracy, and acquire more accurate CSI. Performing measurement based on the data signal on which receiving processing is performed may also improve the measurement accuracy.

In the third exemplary embodiment, the second node may receive the first-type signal and the second-type signal sent by the first transmission node. The second node may determine the CSI based on the measurement of the first-type signal and the second-type signal. The first-type signal may be the measurement RS, and the second-type signal may be one of: the demodulation RS, the data sharing channel signal, and the signal combination of the data sharing channel signal and the demodulation RS. The second node may feed back the CSI to the first node. More specifically, the second node may perform receiving processing to the data sharing channel signal. The CSI may be acquired according to the first-type signal and the second-type signal. The first-type signal may be the measurement RS, and the second-type signal may be the signal combination of the data signal on which the receiving processing is performed and the demodulation RS. The third exemplary embodiment includes multiple sub-embodiments as follows.

Sub-Embodiment 3-1

The second node may perform measurement based on the measurement RS to acquire the first CSI, may perform measurement based on the data signal on which the receiving processing is performed and the demodulation RS to acquire the second CSI, and may acquire the final CSI according to the first CSI and the second CSI. The second node may feed back the CSI to the first node. Using the demodulation RS of the data sharing channel to perform measurement may increase the density of measuring the pilot frequency, improve the measurement accuracy, and acquire more accurate CSI. Performing measurement based on the data signal on which receiving processing is performed may also improve the measurement accuracy.

Sub-Embodiment 3-2

The second node may perform measurement based on the measurement RS to acquire the first CSI, may perform measurement based on the data signal on which the receiving processing is performed and the demodulation RS, and the measurement RS to acquire the second CSI, and may acquire the final CSI according to the first CSI and the second CSI. The second node may feed back the CSI to the first node. Using the demodulation RS of the data sharing channel to perform measurement may increase the density of measuring the pilot frequency, improve the measurement accuracy, and acquire more accurate CSI. Performing measurement based on the data signal on which receiving processing is performed may also improve the measurement accuracy.

Sub-Embodiment 3-3

The second node performs channel measurement based on a non-zero power measurement RS, performs interference measurement based on the data signal on which receiving processing is performed and the demodulation RS, and acquires the CSI according to the measurement result. The second node may feed back the CSI to the first node. Using the demodulation RS of the data sharing channel to perform measurement may increase the density of measuring the pilot frequency, improve the measurement accuracy, and acquire more accurate CSI. Performing measurement based on the data signal on which receiving processing is performed may also improve the measurement accuracy.

Sub-Embodiment 3-4

The second node performs channel measurement based on a non-zero power measurement RS, performs interference measurement based on the data signal on which receiving processing is performed and the demodulation RS, and the zero power measurement RS, and acquires the CSI according to the measurement result. The second node may feed back the CSI to the first node. Using the demodulation RS of the data sharing channel to perform measurement may increase the density of measuring the pilot frequency, improve the measurement accuracy, and acquire more accurate CSI. Performing measurement based on the data signal on which receiving processing is performed may also improve the measurement accuracy.

Sub-Embodiment 3-5

The second node performs channel measurement based on the data signal on which receiving processing is performed and the demodulation RS, performs interference measurement based on the data signal on which receiving processing is performed and the demodulation RS, and the zero power measurement RS, and acquires the CSI according to the measurement result. The second node may feed back the CSI to the first node. Using the demodulation RS of the data sharing channel to perform measurement may increase the density of measuring the pilot frequency, improve the measurement accuracy, and acquire more accurate CSI. Performing measurement based on the data signal on which receiving processing is performed may also improve the measurement accuracy.

In the fourth exemplary embodiment, the second node receives the second-type signal sent by the first transmission node. The second node may determine the CSI based on the measurement of the second-type signal. The second-type signal may be one of: the demodulation RS, the data sharing channel signal, and the signal combination of the data sharing channel signal and the demodulation RS. The second node may feed back the CSI to the first node. More specifically, the second node may perform receiving processing to the data sharing channel signal. The CSI may be acquired according to the second-type signal. The second-type signal may be the signal combination of the data signal on which the receiving processing is performed or the demodulation RS. The fourth exemplary embodiment includes multiple sub-embodiments as follows.

Sub-Embodiment 4-1

The second node processes the received data sharing channel signal to obtain a first data signal, may perform measurement based on the demodulation RS to acquire the ninth CSI, may perform measurement based on the first data signal to acquire the tenth CSI, and acquires the CSI according to the ninth CSI and the tenth CSI. The second node may feed back the CSI to the first node. Using the demodulation RS of the data sharing channel to perform measurement may increase the density of measuring the pilot frequency, improve the measurement accuracy, and acquire more accurate CSI. Performing measurement based on the data signal on which receiving processing is performed may also improve the measurement accuracy.

Sub-Embodiment 4-2

The second node may perform channel measurement and interference measurement based on the demodulation RS to acquire the thirteenth measurement result, corrects channel measurement based on the first data signal to obtain the fourteenth measurement result, and acquires the CSI according to the thirteenth measurement result and the fourteenth measurement result. The second node may feed back the CSI to the first node. Using the demodulation RS of the data sharing channel to perform measurement may increase the density of measuring the pilot frequency, improve the measurement accuracy, and acquire more accurate CSI. Performing measurement based on the data signal on which receiving processing is performed may also improve the measurement accuracy.

Sub-Embodiment 4-3

The second node may perform channel measurement and interference measurement based on the demodulation RS to acquire the fifteenth measurement result, and acquires the CSI according to the fifteenth measurement result. The second node may feed back the CSI to the first node. Using the demodulation RS of the data sharing channel to perform measurement may increase the density of measuring the pilot frequency, improve the measurement accuracy, and acquire more accurate CSI.

In the fifth exemplary embodiment, the second node may receive the first-type signal and the second-type signal sent by the first transmission node. The second node may determine the CSI based on the measurement of the first-type signal and the second-type signal. The first-type signal may be the measurement RS, and the second-type signal may be one of: the demodulation RS, the data sharing channel signal, and the signal combination of the data sharing channel signal and the demodulation RS. The second node may feed back the CSI to the first node. More specifically, the second node may perform receiving processing to the data sharing channel signal. A signal type may be selected from the set of candidate signals, and the CSI may be acquired based on measurement of the selected signal type. The fifth exemplary embodiment includes multiple sub-embodiments as follows.

Sub-Embodiment 5-1

The set of candidate signals is {the measurement RS, the combination of the demodulation RS and the first data signal}. The second node may perform measurement based on the measurement RS to acquire the first CSI, may perform measurement based on the demodulation RS and the measurement RS to acquire the second CSI, and may acquire the final CSI according to the first CSI and the second CSI. The second node may feed back the CSI to the first node. Using the demodulation RS of the data sharing channel to perform measurement may improve the density of measuring the pilot frequency, improve the measurement accuracy, and acquire more accurate CSI.

Note that, the candidate signals in the fifth exemplary embodiment may be any one or multiple of the following five candidate signal sets.

A candidate signal set 1 includes: the measurement RS and the demodulation RS.

A candidate signal set 2 includes: the measurement RS, and a combination of the demodulation RS and the first data signal.

A candidate signal set 3 includes: a combination of the measurement RS and the demodulation RS, and a combination of the measurement RS and the first data signal.

A candidate signal set 4 includes: the measurement RS, the demodulation RS, and the first data signal.

A candidate signal set 5 includes: the demodulation RS and the first data signal.

Sub-Embodiment 5-2

The set of candidate signals is {the measurement RS, the demodulation RS, the first data signal}. In the present exemplary embodiment, the preset condition "the SINR before the data sharing channel signal is demodulated is greater than or equal to a preset threshold SINR_Threshold" is satisfied. In this exemplary embodiment, SINR_Threshold is a real number. The second node may perform channel measurement and interference measurement based on the first data signal, the demodulation RS and the measurement RS to acquire the final CSI. The first data signal may be the soft-output data signal after decoding or the soft-output data signal after demodulation. The second node may feed back the CSI to the first node. When the SINR before the data sharing channel signal is demodulated is greater than or equal to the preset threshold SINR_Threshold, a better measurement result may be obtained based on the first data signal, and then the CSI may be more accurate.

Note that, the preset condition in the fifth exemplary embodiment may alternatively be: a. a sum of absolute values of log likelihood ratios of data obtained by decoding the data sharing channel signal is greater than or equal to a preset threshold; or, b. an estimated data error rate output after the data sharing channel signal is decoded is less than a preset threshold; or, c. when the data of the data sharing channel signal is received correctly; or, d. when the SINR of the pilot frequency on the antenna port is less than a preset threshold. When the preset condition a/b/c/d is satisfied, a better measurement result may be obtained based on the first data signal, and then the CSI may be more accurate. The first data signal may be the soft-output data signal after decoding, or the soft-output data signal after demodulation, or the data signal before demodulation. For example, when the data of the data sharing channel signal is received correctly, coding and modulation and other processing of the transmitting end may be performed to the decoded data, and channel estimation and interference estimation may be performed by using the data signal on the antenna as the pilot frequency, so as to obtain a channel measurement result and an interference measurement result more accurately.

To sum up, by means of the method for determining and feeding back the CSI presented in some embodiments of the disclosure, the communication system may acquire channel quality information on data frequency resources more accurately and more timely. The disadvantages that the method for determining and feeding back the CSI in the related technology cannot provide accurate CSI in a complex wireless channel environment, and cannot provide the CSI on the data frequency resources timely may be addressed. On the basis of being compatible with the existing system, a comparatively small signaling overhead is introduced, so as to realize adaptive coding and modulation better and improve the system throughput.

In another exemplary embodiment, software is also provided, which is used for performing the technical solutions described in the above exemplary embodiments and exemplary implementation modes.

In another exemplary embodiment, a storage medium is also provided, in which the software is stored. The storage medium may include, but is not limited to, a compact disc, a floppy disk, a hard disk, an erasable memory, and so on.

Obviously, those skilled in the art should appreciate that the above modules and acts of the disclosure may be implemented by a general-purpose computing apparatus, and they may be centralized in a single computing apparatus or distributed on a network composed of multiple computing devices. In an exemplary embodiment, the above modules and acts may be implemented by a program code which is capable of being executed by the computing apparatus, so that they may be stored in a storage apparatus and executed by the computing apparatus. In some cases, the presented or described acts may be performed in a sequence different from the sequence described herein, or they may be made into integrated circuit modules respectively, or multiple modules and acts of them may be made into a single integrated circuit module to implement. Thus, the disclosure is not limited to any particular combination of hardware and software.

The above is only the exemplary embodiment of the disclosure and not intended to limit the disclosure; for those skilled in the art, the disclosure may have various modifications and changes. Any modifications, equivalent replacements, improvements and the like within the principle of the disclosure shall fall within the scope of protection defined by the appended claims of the disclosure.

INDUSTRIAL APPLICABILITY

The disclosure, relating to the communication field, provides a method and device for acquiring the CSI. In the method, a second node receives a first-type signal and/or a second-type signal sent by a first node; the second node acquires CSI based on measurement of the first-type signal and the second-type signal, or based on measurement of the second-type signal only; and in this exemplary embodiment, the first-type signal may include the measurement RS, and the second-type signal may include one of: the demodulation RS, the data sharing channel signal, and the signal combination of the data sharing channel signal and the demodulation RS; and the second node feeds back the CSI to the first node. By means of some embodiments of the disclosure, a problem in the related technology that CSI measurement accuracy is not high and CSI feedback on a data sharing channel is not timely may be solved, thereby realizing adaptive coding and modulation better and improving the system throughput.

What is claimed is:

1. A method for acquiring Channel State Information (CSI), comprising:
   receiving, by a second node, a first-type signal and/or a second-type signal sent by a first node, wherein the second node is a terminal, and the first node is a base station;
   acquiring, by the second node, CSI based on measurement of the first-type signal and the second-type signal, or based on measurement of the second-type signal only; wherein the CSI is a report set of CSI report modes, the report set comprises at least one of: a combination of a wide-band CSI report set and a Physical Downlink Shared Channel (PDSCH) sub-band CSI report set, and the PDSCH sub-band CSI report set; the first-type signal comprises a measurement Reference Signal (RS), and the second-type signal comprises one of: a demodulation RS, a data sharing channel signal, and a signal combination of the data sharing channel signal and the demodulation RS;
   feeding back, by the second node, the CSI to the first node.

2. The method as claimed in claim 1, wherein modes of acquiring, by the second node, the CSI based on the measurement of the first-type signal and the second-type signal, or based on the measurement of the second-type signal only comprise at least one of:
   Mode 1:
   acquiring the CSI according to the first-type signal and a first data signal, or according to the first-type signal and the demodulation RS; wherein the first data signal is obtained by processing the received data sharing channel signal;
   Mode 2:
   processing the received data sharing channel signal to obtain a first data signal; and
   acquiring the CSI according to the first-type signal, the first data signal and the demodulation RS;
   Mode 3:
   acquiring the CSI according to the second-type signal;
   Mode 4:
   selecting a signal type from a set of candidate signals; and
   acquiring the CSI based on measurement of the selected signal type.

3. The method as claimed in claim 2, wherein the Mode 1 of acquiring the CSI comprises at least one of the following sub-modes:
   Sub-mode 1a:
   performing measurement based on the first-type signal to acquire first CSI;
   performing measurement based on the first data signal or the demodulation RS to acquire second CSI; and
   acquiring the CSI according to the first CSI and the second CSI;
   Sub-mode 1b:
   performing measurement based on the first-type signal to acquire third CSI;
   performing measurement based on the first data signal and the first-type signal, or based on the demodulation RS and the first-type signal to obtain fourth CSI; and
   acquiring the CSI according to the third CSI and the fourth CSI;
   Sub-mode 1c:
   performing channel measurement based on a non-zero power measurement RS to obtain a first measurement result;
   performing interference measurement based on the first data signal or the demodulation RS to obtain a second measurement result; and
   acquiring the CSI according to the first measurement result and the second measurement result;
   Sub-mode 1d:
   performing channel measurement based on a non-zero power measurement RS to obtain a third measurement result;
   performing interference measurement based on the first data signal and a zero power measurement RS, or based on the demodulation RS and the zero power measurement RS to obtain a fourth measurement result; and
   acquiring the CSI according to the third measurement result and the fourth measurement result;
   Sub-mode 1e:
   performing channel measurement based on the first data signal or the demodulation RS to obtain a fifth measurement result;
   performing interference measurement based on the first data signal and a zero power measurement RS, or based on the demodulation RS and the zero power measurement RS to obtain a sixth measurement result; and
   acquiring the CSI according to the fifth measurement result and the sixth measurement result.

4. The method as claimed in claim 2, wherein the Mode 2 of acquiring the CSI comprises at least one of the following sub-modes:
   Sub-mode 2a:
   performing measurement based on the first-type signal to acquire fifth CSI;
   performing measurement based on the first data signal and the demodulation RS to acquire sixth CSI; and
   acquiring the CSI according to the fifth CSI and the sixth CSI;
   Sub-mode 2b:
   performing measurement based on the first-type signal to acquire seventh CSI;

performing measurement based on the first data signal, the demodulation RS and the first-type signal to obtain eighth CSI; and acquiring the CSI according to the seventh CSI and the eighth CSI;

Sub-mode 2c:

performing channel measurement based on a non-zero power measurement RS to obtain a seventh measurement result;

performing interference measurement based on the first data signal and the demodulation RS to obtain an eighth measurement result; and acquiring the CSI according to the seventh measurement result and the eighth measurement result;

Sub-mode 2d:

performing channel measurement based on a non-zero power measurement RS to obtain a ninth measurement result;

performing interference measurement based on the first-type signal, the demodulation RS and a zero power measurement RS to obtain a tenth measurement result; and acquiring the CSI according to the ninth measurement result and the tenth measurement result;

Sub-mode 2e:

performing channel measurement based on the first data signal and the demodulation RS to obtain an eleventh measurement result;

performing interference measurement based on the first data signal, the demodulation RS and a zero power measurement RS to obtain a twelfth measurement result; and acquiring the CSI according to the eleventh measurement result and the twelfth measurement result.

5. The method as claimed in claim 2, wherein the Mode 3 of acquiring the CSI comprises at least one of the following sub-modes:

Sub-mode 3a:

processing the received data sharing channel signal to obtain a first data signal; and performing measurement based on the demodulation RS to acquire ninth CSI;

performing measurement based on the first data signal to acquire tenth CSI; and acquiring the CSI according to the ninth CSI and the tenth CSI;

Sub-mode 3b:

performing channel measurement and interference measurement based on the demodulation RS to obtain a thirteenth measurement result;

correcting channel measurement based on the first data signal to obtain a fourteenth measurement result; and acquiring the CSI according to the thirteenth measurement result and the fourteenth measurement result;

Sub-mode 3c:

performing channel measurement and interference measurement based on the demodulation RS to obtain a fifteenth measurement result; and acquiring the CSI according to the fifteenth measurement result.

6. The method as claimed in claim 1, wherein the measurement based on the first-type signal and the second-type signal, or the measurement based on the second-type signal only, which is performed by the second node, comprises at least one of:

channel measurement and interference measurement.

7. The method as claimed in claim 2, wherein when acquiring the CSI according to the Mode 4, the set of candidate signals comprises at least one of:

a candidate signal set 1 comprising: the measurement RS and the demodulation RS;

a candidate signal set 2 comprising: the measurement RS, and a combination of the demodulation RS and the first data signal;

a candidate signal set 3 comprising: a combination of the measurement RS and the demodulation RS, and a combination of the measurement RS and the first data signal, wherein the first data signal is obtained by processing the data sharing channel signal;

a candidate signal set 4 comprising: the measurement RS, the demodulation RS, and the first data signal;

a candidate signal set 5 comprising: the demodulation RS and the first data signal.

8. The method as claimed in claim 2, wherein when a preset condition is satisfied, the first data signal is selected from the set of candidate signals, and the CSI is acquired based on the first data signal; wherein the preset condition at least comprises one of:

a Signal to Interference plus Noise Ratio (SINR) before the data sharing channel signal is demodulated is greater than or equal to a preset threshold;

a sum of absolute values of log likelihood ratios of data obtained by decoding the data sharing channel signal is greater than or equal to a preset threshold;

an estimated data error rate output after the data sharing channel signal is decoded is less than a preset threshold;

an SINR of a pilot frequency on an antenna port is less than a preset threshold;

data of the data sharing channel signal is received correctly.

9. The method as claimed in claim 2, wherein the first data signal comprises at least one of: a soft-output data signal after decoding, a soft-output data signal after demodulation and a data signal before demodulation.

10. The method as claimed in claim 1, wherein the CSI comprises at least one of: first-type CSI and second-type CSI, wherein the first-type CSI comprises at least one of: a Channel Quality Indicator (CQI), a Precoding Matrix Indicator (PMI), a Rank Indicator (RI), channel matrix indicator information, beam indication information, antenna selection indication information, error level indication information, repetitions level indication information, and power parameter level indication information; the second-type CSI comprises at least one of: interference resource location indication information, interference channel indication information, interference channel correlation matrix indication information, transmission parameters of an interference signal, and interference level indication information.

11. The method as claimed in claim 1, wherein the wide-band CSI report set is used for indicating the CSI on a sub-band set S1 on system bandwidth, wherein the sub-band set S1 on the system bandwidth comprises K1 sub-bands; the PDSCH sub-band CSI report set is used for indicating the CSI on a sub-band set S2 corresponding to a data sharing channel; the sub-band set S2 comprises K2 sub-bands, where the K1 and the K2 are integers greater than 1.

12. The method as claimed in claim 1, wherein a sub-band size k1 of the sub-band set S1 on the system bandwidth is determined according to the system bandwidth; a sub-band size k2 of the sub-band set S2 of PDSCH sub-bands is determined according to a bandwidth occupied by the PDSCH; where the k1 and the k2 are integers greater than 1.

13. The method as claimed in claim 12, wherein the sub-band size k2 of the sub-band set S2 of the PDSCH sub-bands increases along with increase of the bandwidth occupied by the PDSCH.

14. The method as claimed in claim 1, wherein the PDSCH sub-bands are determined according to at least one of the following definitions:

a PDSCH sub-band definition 1:
the PDSCH sub-bands are a segment of frequency resources; a starting point of the PDSCH sub-band set is the first Resource Block (RB) of frequency resources occupied by the PDSCH, and floor(PDSCHBW/k2) PDSCH sub-bands among all PDSCH sub-bands in the PDSCH sub-band set have a bandwidth of k2;
if the PDSCHBW/k2 is not an integer, remaining RBs of the PDSCH except RBs occupied by the floor(PDSCHBW/k2) PDSCH sub-bands form one sub-band, and frequency resources of the floor(PDSCHBW/k2)+1 PDSCH sub-bands are not overlapped, and the floor(PDSCHBW/k2)+1 PDSCH sub-bands form the PDSCH sub-band set;
if the PDSCHBW/k2 is an integer, frequency resources of the floor(PDSCHBW/k2) PDSCH sub-bands are not overlapped, and the floor(PDSCHBW/k2) PDSCH sub-bands form the PDSCH sub-band set;
wherein the PDSCHBW is a size of the frequency resources occupied by the PDSCH, and is an integer greater than 0; floor represents rounding down;

a PDSCH sub-band definition 2:
the PDSCH sub-bands are a segment of frequency resources; a starting point of the PDSCH sub-band set is the first RB of frequency resources occupied by the PDSCH, and ceil(PDSCHBW/k2) PDSCH sub-bands among all PDSCH sub-bands in the PDSCH sub-band set have a bandwidth of k2; frequency resources of the ceil(PDSCHBW/k2) PDSCH sub-bands are not overlapped, and the ceil(PDSCHBW/k2) PDSCH sub-bands form the PDSCH sub-band set; if the PDSCHBW/k2 is not an integer, at least one of the PDSCH sub-bands comprises one or more RBs except the frequency resources occupied by the PDSCH; wherein ceil represents rounding up;

a PDSCH sub-band definition 3:
the PDSCH sub-bands are a segment of frequency resources; an end point of the PDSCH sub-band set is the last RB of frequency resources occupied by the PDSCH, and floor(PDSCHBW/k2) PDSCH sub-bands among all PDSCH sub-bands in the PDSCH sub-band set have a bandwidth of k2;
if the PDSCHBW/k2 is not an integer, remaining RBs of the PDSCH except RBs occupied by the floor(PDSCHBW/k2) PDSCH sub-bands form one sub-band, and frequency resources of the floor(PDSCHBW/k2)+1 PDSCH sub-bands are not overlapped, and the floor(PDSCHBW/k2)+1 PDSCH sub-bands form the PDSCH sub-band set;
if the PDSCHBW/k2 is an integer, frequency resources of the floor(PDSCHBW/k2) PDSCH sub-bands are not overlapped, and the floor(PDSCHBW/k2) PDSCH sub-bands form the PDSCH sub-band set; wherein PDSCHBW is a size of the frequency resources occupied by the PDSCH;

a PDSCH sub-band definition 4:
the PDSCH sub-bands are a segment of frequency resources; an end point of the PDSCH sub-band set is the last RB of frequency resources occupied by the PDSCH, and ceil(PDSCHBW/k2) PDSCH sub-bands among all PDSCH sub-bands in the PDSCH sub-band set have a bandwidth of k2; frequency resources of the ceil(PDSCHBW/k2) PDSCH sub-bands are not overlapped, and the ceil(PDSCHBW/k2) PDSCH sub-bands form the PDSCH sub-band set;
if the PDSCHBW/k2 is not an integer, at least one of the PDSCH sub-bands comprises one or more RBs except the frequency resources occupied by the PDSCH, wherein ceil represents rounding up;

a PDSCH sub-band definition 5:
the PDSCH sub-bands are a segment of frequency resources; a sub-band in the sub-band set S1 on the system bandwidth is a sub-band in the PDSCH sub-band set when and only when frequency resources occupied by the sub-band are overlapped with frequency resources occupied by the PDSCH.

15. The method as claimed in claim 1, wherein the CSI on the sub-band set S2 comprises at least one of:

A1: the sub-band set S2 has K2 sub-bands; for each sub-band, the CSI comprises one precoding matrix index set I for indicating precoding matrixes, and one CQI or two CQIs, wherein the precoding matrix index set I comprises an index i, or a pair of precoding matrix indexes (i1, i2), or three precoding matrix indexes (i1, i2, i3);

A2: the sub-band set S2 has K2 sub-bands; for each sub-band, the CSI comprises one CQI or two CQIs;

A3: the sub-band set S2 has K2 sub-bands; for all the K2 sub-bands, the CSI comprises one precoding matrix index set I for indicating precoding matrixes;

A4: the sub-band set S2 has K2 sub-bands; for all the K2 sub-bands, the CSI comprises one CQI or a pair of CQIs;

A5: M shielded sub-bands or M sub-bands which are not suitable for downlink data transmission are selected from the sub-band set S2; for all the M sub-bands, the CSI comprises one precoding matrix index set I for indicating precoding matrixes, wherein a precoding matrix index is used for providing frequency resources and spatial resources occupied by an interference signal;

A6: M shielded sub-bands or M sub-bands which are not suitable for downlink data transmission are selected from the sub-band set S2; for all sub-bands in the K2 sub-bands except the M sub-bands, the CSI comprises one CQI or a pair of CQIs;

A7: M shielded sub-bands or M sub-bands which are not suitable for downlink data transmission are selected from the sub-band set S2; for all sub-bands in the K2 sub-bands except the M sub-bands, the CSI comprises one precoding matrix index set I for indicating precoding matrixes;

wherein K2 and M are integers greater than 1, and M is less than K2; i, i1, i2 and i3 are positive integers greater than or equal to 0.

16. A method for acquiring Channel State Information (CSI), comprising:
sending to a second node, by a first node, a first-type signal and/or a second-type signal, wherein the second node is a terminal, and the first node is a base station;
receiving, by the first node, CSI fed back by the second node;

wherein the CSI is a report set of CSI report modes, the report set comprises at least one of: a combination of a wide-band CSI report set and a Physical Downlink Shared Channel (PDSCH) sub-band CSI report set, and the PDSCH sub-band CSI report set; the CSI is acquired by the second node based on measurement of the first-type signal and the second-type signal, or based on measurement of the second-type signal only; the first-type signal comprises a measurement Reference Signal (RS), and the second-type signal comprises one of: a demodulation RS, a data sharing channel signal, and a signal combination of the data sharing channel signal and the demodulation RS.

17. An apparatus for acquiring Channel State Information (CSI), which is applied to a second node, comprising a hardware processor arranged to execute program modules comprising:
   a receiving module, which is configured to receive a first-type signal and/or a second-type signal sent by a first node, wherein the second node is a terminal, and the first node is a base station;
   an acquiring module, which is configured to acquire CSI based on measurement of the first-type signal and the second-type signal, or based on measurement of the second-type signal only; wherein the CSI is a report set of CSI report modes, the report set comprises at least one of: a combination of a wide-band CSI report set and a Physical Downlink Shared Channel (PDSCH) sub-band CSI report set, and the PDSCH sub-band CSI report set; the first-type signal comprises a measurement Reference Signal (RS), and the second-type signal comprises one of: a demodulation RS, a data sharing channel signal, and a signal combination of the data sharing channel signal and the demodulation RS; and
   a feedback module, which is configured to feed back the CSI to the first node.

18. An apparatus for acquiring Channel State Information (CSI), which is applied to a first node, comprising a hardware processor arranged to execute program modules comprising:
   a sending module, which is configured to send to a second node a first-type signal and/or a second-type signal, wherein the second node is a terminal, and the first node is a base station;
   a receiving module, which is configured to receive CSI fed back by the second node;
   wherein the CSI is a report set of CSI report modes, the report set comprises at least one of: a combination of a wide-band CSI report set and a Physical Downlink Shared Channel (PDSCH) sub-band CSI report set, and the PDSCH sub-band CSI report set; the CSI is acquired by the second node based on measurement of the first-type signal and the second-type signal, or based on measurement of the second-type signal only; the first-type signal comprises a measurement Reference Signal (RS), and the second-type signal comprises one of: a demodulation RS, a data sharing channel signal, and a signal combination of the data sharing channel signal and the demodulation RS.

19. The method as claimed in claim 1, further comprising:
   sending to the second node, by the first node, the first-type signal and/or the second-type signal;
   receiving, by the first node, the CSI fed back by the second node.

* * * * *